US012598485B2

(12) United States Patent
Xia

(10) Patent No.: US 12,598,485 B2
(45) Date of Patent: ***Apr. 7, 2026

(54) COMMUNICATION METHOD AND APPARATUS FOR PLURALITY OF ADMINISTRATIVE DOMAINS

(71) Applicant: Huawei Technologies Co., Ltd., Shenzhen (CN)

(72) Inventor: Haitao Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/745,418

(22) Filed: Jun. 17, 2024

(65) Prior Publication Data

US 2024/0414566 A1 Dec. 12, 2024

Related U.S. Application Data

(63) Continuation of application No. 17/653,038, filed on Mar. 1, 2022, now Pat. No. 12,035,156, which is a
(Continued)

(30) Foreign Application Priority Data

Sep. 2, 2019 (CN) .......................... 201910823510.1

(51) Int. Cl.
*H04W 24/02* (2009.01)
*H04L 41/0631* (2022.01)
(Continued)

(52) U.S. Cl.
CPC ......... *H04W 24/02* (2013.01); *H04L 41/0631* (2013.01); *H04W 8/18* (2013.01); *H04W 24/10* (2013.01); *H04W 48/18* (2013.01)

(58) Field of Classification Search
CPC ..... H04W 24/02; H04W 24/10; H04W 48/18; H04W 8/18; H04L 41/0631
See application file for complete search history.

(56) References Cited

U.S. PATENT DOCUMENTS

2017/0063714 A1 3/2017 Xiang
2018/0324261 A1 11/2018 Yi
(Continued)

FOREIGN PATENT DOCUMENTS

CN 108347343 A 7/2018
CN 109587024 A 4/2019
(Continued)

OTHER PUBLICATIONS

Network Functions Virtualisation (NFV) Release3; Management and Orchestration; Multiple Administrative Domain, Aspect Interfaces Specification, ETSI GS NFV-IFA 030, Apr. 2019, 24 pages, V3.2.1.
(Continued)

*Primary Examiner* — Kenny S Lin
(74) *Attorney, Agent, or Firm* — Slater Matsil, LLP

(57) ABSTRACT

Disclosed are a communication method and apparatus for a plurality of administrative domains, where the plurality of administrative domains include a composite network service (NS) administrative domain and a nested network service (NS) administrative domain, and the composite NS administrative domain and the nested NS administrative domain respectively include a composite network functions virtualization orchestrator (NFVO) and a nested NFVO. According to the communication method and apparatus for a plurality of administrative domains, the composite NFVO sends a subscription request message for analysis and prediction information of a nested NS instance to the nested NFVO,
(Continued)

and performs a corresponding management operation based on received analysis and prediction information.

20 Claims, 8 Drawing Sheets

Related U.S. Application Data continuation of application No. PCT/CN2020/111824, filed on Aug. 27, 2020.

(51) Int. Cl.
    *H04W 8/18*    (2009.01)
    *H04W 24/10*   (2009.01)
    *H04W 48/18*   (2009.01)

(56) References Cited

U.S. PATENT DOCUMENTS

| | | | |
|---|---|---|---|
| 2019/0052549 A1 | 2/2019 | Duggal et al. | |
| 2019/0123963 A1* | 4/2019 | Tang ................... | G06F 9/45558 |
| 2019/0149434 A1 | 5/2019 | Chou | |
| 2019/0273668 A1 | 9/2019 | Xia | |
| 2019/0349258 A1 | 11/2019 | Xia | |
| 2020/0110627 A1 | 4/2020 | Chou | |
| 2020/0136978 A1* | 4/2020 | Li ......................... | H04L 67/141 |
| 2020/0322232 A1 | 10/2020 | Xia | |
| 2020/0366493 A1* | 11/2020 | Sood ................... | H04L 63/0272 |
| 2021/0135958 A1 | 5/2021 | Xia | |
| 2021/0160147 A1* | 5/2021 | Chou .................... | H04L 41/147 |
| 2022/0022026 A1* | 1/2022 | Sharma ................... | H04W 8/12 |

FOREIGN PATENT DOCUMENTS

| | | | |
|---|---|---|---|
| CN | 109964449 A | 7/2019 |
| CN | 107005426 B | 7/2020 |
| EP | 3534568 A1 | 9/2019 |
| JP | 2018019400 A | 2/2018 |
| JP | 2018523434 A | 8/2018 |
| JP | 2019536365 A | 12/2019 |
| JP | 2020530703 A | 10/2020 |
| WO | 2018090299 A1 | 5/2018 |
| WO | 2018137572 A1 | 8/2018 |
| WO | 2019127418 A1 | 7/2019 |
| WO | 2019158777 A1 | 8/2019 |

OTHER PUBLICATIONS

Network Functions Virtualisation (NFV) Release 3; Management and Orchestration; Report on architecture options to support multiple administrative domains, ETSI GR NFV-IFA 028, Jan. 2018, 59 pages, V3.1.1.

Intel, "pCR 28.803 solution for edge computing deployment", 3GPP TSG SA WG5 (Telecom Management) Meeting #124, S5-192404, Feb. 25-Mar. 1, 2019, 4 Pages, Taipei, Taiwan.

X. Li et al., "Service orchestration and federation for verticals," 2018 IEEE Wireless Communications and Networking Conference Workshops (WCNCW), Barcelona, Spain, 2018, pp. 260-265, doi: 10.1109/WCNCW.2018.8369008. (Year: 2018).

* cited by examiner

COMMUNICATION METHOD AND APPARATUS FOR PLURALITY OF ADMINISTRATIVE DOMAINS

CROSS-REFERENCE TO RELATED APPLICATIONS

This application is a continuation of U.S. patent application Ser. No. 17/653,038, filed on Mar. 1, 2022, which is a continuation of International Application No. PCT/CN2020/111824, filed on Aug. 27, 2020, The International Application claims priority to Chinese Patent Application No.201910823510.1, filed on Sep. 2, 2019. All of the afore-mentioned patent applications are hereby incorporated by reference in their entireties.

TECHNICAL FIELD

This application relates to the communication field, and in particular, to a communication method and apparatus for a plurality of administrative domains.

BACKGROUND

Network function virtualization (NFV) means that a telecommunications network operator uses a virtualization technology in an information technology (IT) field to decouple software from hardware for some telecommunications network functions (for example, functions of a core network) on a general-purpose server, a switch, and a memory, so as to implement rapid and efficient deployment and operation of a network service (NS) and reduce the capital expense (CAPEX) and operating expense (OPEX) of a network. By applying the NFV technology, the telecommunications network functions are implemented in a software manner, may run on general-purpose server hardware, and may be migrated, instantiated, and deployed at different physical locations of a network as required, without a need to install a new device.

Standardization of the NFV mainly focuses on network services, virtualized network functions (VNF), and management and orchestration (MANO) of virtual resources. The Interface and Architecture (IFA) Working Group of the NFV Industry Specification Group under the European Telecommunications Standards Institute (ETSI) formulates functions in the MANO framework. A functional architecture of the NFV is shown in FIG. 1.

(1) NFV orchestrator (NFVO): The NFVO implements management and processing of a network service descriptor (NSD) and a virtualized network function forwarding graph (VNFFG), and network service life cycle management, cooperates with a VNFM to implement life cycle management of the VNF, and has a global view function of virtual resources. A life cycle management (LCM) operation refers to a series of management operation processes such as instantiation, scaling, updating, healing, and termination. It covers all management operations in a life cycle from creation to termination of an instance. For detailed definitions, refer to ETSI NFV 003: life cycle management: set of functions required to manage the instantiation, maintenance and termination of a VNF or NS.

(2) VNF manager (VNFM): The VNFM performs life cycle management of the virtualized network function (VNF), including management of the virtualized network function descriptor (VNFD), instantiation of the VNF, scaling of a VNF instance (including scaling out/up and scaling in/down), healing of the VNF instance, and termination of the VNF instance. The VNFM can further receive a scaling policy delivered by the NFVO, to implement VNF auto scaling.

(3) Virtualized infrastructure manager (VIM): The VIM is mainly responsible for management (including reservation and allocation) of virtualized resources (including virtual computing, storage, and network resources) at the infrastructure layer, status monitoring and fault reporting of virtual resources, and providing a virtualized resource pool for upper-layer applications.

(4) Operations and business support systems (OSS/BSS): An existing operation and maintenance system OSS/BSS of an operator.

(5) Element manager (EM): The EM performs conventional fault management, configuration management, account management, performance management, security management (Fault Management, Configuration Management, Account Management, Performance Management, Security Management, FCAPS) functions for the VNF.

(6) Virtualized network function (VNF): The VNF is corresponding to a physical network function (PNF) in a conventional non-virtualized network, such as a virtualized EPC node (MME, SGW, PGW, or the like). A functional behavior and a state of a network function are unrelated to whether the network function is virtualized. NFV technical requirements expect that the VNF and the PNF have the same functional behavior and external interface.

(7) NFV infrastructure (NFVI): The NFVI is an infrastructure layer of an NFV function, and includes a hardware resource, a virtual resource, and a virtualization layer. From the perspective of the VNF, the virtualization layer and the hardware resource seem to constitute an entity that can provide a required virtualized resource.

For deployment of a network service (NS), there is a scenario in which the NS is provided across administrative domains. This scenario occurs when a large service provider provides a global NS through collaboration between branches, or when different service providers provide an NS leasing service by using a network sharing protocol. This scenario has been studied in the research topic of ETSI NFV IFA 028. The global NS is referred to as a composite NS (Composite NS). A hierarchical structure of composite NS contains a plurality of nested NSs (Nested NS), and each nested NS is provided by an administrative domain different from that of the composite NS. As shown in FIG. 2, an administrative domain refers to a set of MANO management function entities that includes one or more data centers (Data Center), VIMs, and VNFMs (including VNFs managed by the VNFMs). Each administrative domain includes one NFVO, configured to provide a group of network services of a specific set in the administrative domain. As defined in the ETSI NFV IFA 030 technical specification, NFVOs in different administrative domains in this scenario implement management functions of nested NSs through coordination, such as NS descriptor management, NS life cycle management, NS performance management, NS fault management, and NS policy management.

NFV is the first stage of cloudification of telecommunications network functions. NFV effectively reduces hardware purchasing costs of a conventional telecommunications network by using a business model that features decoupling software from hardware and separate purchasing. In addition, a development objective of the next stage of cloudification of a telecommunications network is to improve automation, so as to further reduce costs in network deployment and operation and maintenance, and promote service innovation. Currently, some standards organizations (for example, ETSI ZSM Industry Specification Group) and open source organizations (for example, the ONAP) in the industry are all engaged in research work related to operation and maintenance automation of a telecommunications network.

Research on operation and maintenance automation is carried out in the NFV field, and provision of network services in a plurality of administrative domains is a basic research scenario with a demonstration effect. Each administrative domain may be considered as an autonomous domain of operation and maintenance management. Virtualized network function (VNF) management and virtual resource management in the autonomous domain may be provided by using a vertical full stack solution, and high-level operation and maintenance automation is implemented between autonomous domains through NFVO management and orchestration.

Currently, the NFV MANO standard provides few mechanisms for supporting operation and maintenance management automation. An upper-level management entity (for example, an NFVO) initiates a management operation oriented to a managed object (for example, a VNF) to a lower-level management entity (for example, a VNFM). The lower-level management entity parses the operation request command and performs a management operation, and feeds back an execution result to the upper-level management entity that initiates the operation request, for example, an OSS/a BSS. In addition, manual participation is required to determine subsequent operations. In a scenario in which an NS is provided in a plurality of administrative domains, this top-down operation method is also used for coordination between NFVOs. This status leads to a relatively low degree of functional support for operation and maintenance automation in the NFV domain, and does not meet requirements for large closed-loop automation (analysis, feedback, and distribution) during operation and maintenance of big data after an intelligent mass data analysis module is introduced in the NFV domain in the future.

SUMMARY

A technical solution provided in embodiments of the present invention can resolve the technical problem of a relatively low degree of operation and maintenance automation of an NFV system in a conventional technology. The technical solution includes a method, an apparatus, and the like. Details are as follows:

A communication method for a plurality of administrative domains is provided, where the plurality of administrative domains include a composite network service (NS) administrative domain and a nested network service (NS) administrative domain, the composite NS administrative domain and the nested NS administrative domain respectively include a composite network functions virtualization orchestrator (NFVO) and a nested NFVO, and the method includes: the composite NFVO sends a subscription request message for analysis and prediction information of a nested NS instance to the nested NFVO, where the subscription request message carries an identifier of the nested NS instance, a type of the analysis and prediction information, and corresponding analysis dimension information; the composite NFVO receives a subscription response message returned by the nested NFVO; the composite NFVO receives a notification message that is sent by the nested NFVO and that carries the analysis and prediction information of the nested NS instance, where the analysis and prediction information is generated by the nested NFVO after performing data analysis on the nested NS instance in the analysis dimension based on the type of the analysis and prediction information; and the composite NFVO performs a corresponding management operation based on the received analysis and prediction information.

An embodiment of the present invention further provides a communication method for a plurality of administrative domains, where the plurality of administrative domains include a composite network service (NS) administrative domain and a nested network service (NS) administrative domain, the composite NS administrative domain and the nested NS administrative domain respectively include a composite network functions virtualization orchestrator (NFVO) and a nested NFVO, and the method includes:

the nested NFVO performs a life cycle management (LCM) operation on a nested NS;

the nested NFVO sends a request message for coordinating the LCM operation to the composite NFVO, where the request message carries a type of the LCM operation and an operation stage in which the LCM operation is located;

the nested NFVO receives an LCM coordination response returned by the composite NFVO, where the response message carries a coordination operation instruction of the composite NFVO for the LCM of the nested NS; and the nested NFVO performs an LCM operation on the nested NS based on the coordination operation instruction.

An embodiment of the present invention provides a communication method for a plurality of administrative domains, where the plurality of administrative domains include a composite network service (NS) administrative domain and a nested network service (NS) administrative domain, the composite NS administrative domain and the nested NS administrative domain respectively include a composite network functions virtualization orchestrator (NFVO) and a nested NFVO, and the method includes:

the nested NFVO sends a subscription request message for analysis and prediction information of a composite NS instance to the composite NFVO, where the subscription request message carries an identifier of the composite NS instance, a type of the analysis and prediction information, and corresponding analysis dimension information;

the nested NFVO receives a subscription response message returned by the composite NFVO;

the nested NFVO receives a notification message that is sent by the composite NFVO and that carries the analysis and prediction information of the composite NS instance, where the analysis and prediction information is generated by the composite NFVO after performing data analysis on the composite NS instance in the analysis dimension based on the type of the analysis and prediction information; and the nested NFVO performs a corresponding management operation based on the received analysis and prediction information.

The type of the analysis and prediction information carried in the subscription request message may be an analysis report of the NS instance or an empirical model of the NS instance.

Further, the analysis report may be a health analysis report. Analysis dimension information of the health analysis report includes a quantity of outgoing and incoming bytes of a service access point of the composite NS instance and/or a quantity of incoming and outgoing packets of the service access point of the composite NS instance. The health analysis report further includes a comprehensive evaluation result, which includes a health status indication and the like.

An embodiment of the present invention further provides a composite NFVO, where the composite NFVO is located in a composite network service (NS) administrative domain, and the composite NFVO includes:

a sending unit, configured to send a subscription request message for analysis and prediction information of a nested NS instance to a nested NFVO, where the subscription request message carries an identifier of the nested NS instance, a type of the analysis and prediction information, and corresponding analysis dimension information;

a receiving unit, configured to receive a subscription response message returned by the nested NFVO, where the receiving unit is further configured to receive a notification message that is sent by the nested NFVO and that carries the analysis and prediction information of the nested NS instance, where the analysis and prediction information is generated by the nested NFVO after performing data analysis on the nested NS instance in the analysis dimension based on the type of the analysis and prediction information; and an analysis and management unit, configured to perform a corresponding management operation based on the received analysis and prediction information.

An embodiment of the present invention provides a nested NFVO, where the nested NFVO is located in a nested network service (NS) administrative domain, and the nested NFVO includes:

a sending unit, configured to send a subscription request message for analysis and prediction information of a composite NS instance to a composite NFVO, where the subscription request message carries an identifier of the composite NS instance, a type of the analysis and prediction information, and corresponding analysis dimension information;

a receiving unit, configured to receive a subscription response message returned by the composite NFVO, where the receiving unit is further configured to receive a notification message that is sent by the composite NFVO and that carries the analysis and prediction information of the composite NS instance, where the analysis and prediction information is generated by the composite NFVO after performing data analysis on the composite NS instance in the analysis dimension based on the type of the analysis and prediction information; and an analysis and management unit, configured to perform a corresponding management operation based on the received analysis and prediction information.

An embodiment of the present invention provides a nested NFVO, where the nested NFVO is located in a nested network service (NS) administrative domain, and the nested NFVO includes:

an analysis and management unit, configured to perform a life cycle management (LCM) operation on a nested NS;

a sending unit, configured to send a request message for coordinating the LCM operation to a composite NFVO, where the request message carries a type of the LCM operation and an operation stage in which the LCM operation is located; and a receiving unit, configured to receive an LCM coordination response returned by the composite NFVO, where the response message carries a coordination operation instruction of the composite NFVO for the LCM of the nested NS; where the analysis and management unit is configured to perform the LCM operation on the nested NS based on the coordination operation instruction.

An embodiment of the present invention provides an NFVO apparatus, where the apparatus includes a processor and a memory, where the memory is configured to store executable program instructions for performing any one of the foregoing methods; and the processor is configured to execute the program instructions stored in the memory, so that the NFVO apparatus performs the steps described in any one of the foregoing methods.

An embodiment of the present invention provides a computer-readable storage medium, where the computer-readable storage medium stores executable program instructions, and when the executable program instructions are run, the steps in any one of the foregoing methods are performed.

An embodiment of the present invention further provides a computer program product, and when being executed, the computer product is used to perform the steps of the foregoing methods.

In a scenario in which there are a plurality of administrative domains, in the embodiments of the present invention, the analysis and prediction information is subscribed to and obtained between different NFVO s, thereby improving a closed-loop automation degree of NS life cycle management. Further, because a built-in data analysis module (for example, having an AI algorithm) is disposed in the composite NFVO and the nested NFVO, accuracy of the analysis result and analysis efficiency are higher than those of manual judgment in a conventional technology.

DETAILED DESCRIPTION OF ILLUSTRATIVE EMBODIMENTS

To make objectives, technical solutions, and advantages of this application clearer, the following further describes implementations of the present invention in detail with reference to the accompanying drawings.

The solution of the present invention provides a communication method for a plurality of administrative domains. In a scenario in which there are a plurality of administrative domains, an NFVO in an administrative domain subscribes to analysis and prediction information of an NS instance from an NFVO in an associated administrative domain, so as to enhance monitoring and analysis of a running status of an NS instance in the associated administrative domain, and automatically trigger a corresponding management operation on the NS instance based on this feedback mechanism.

Figure 1:
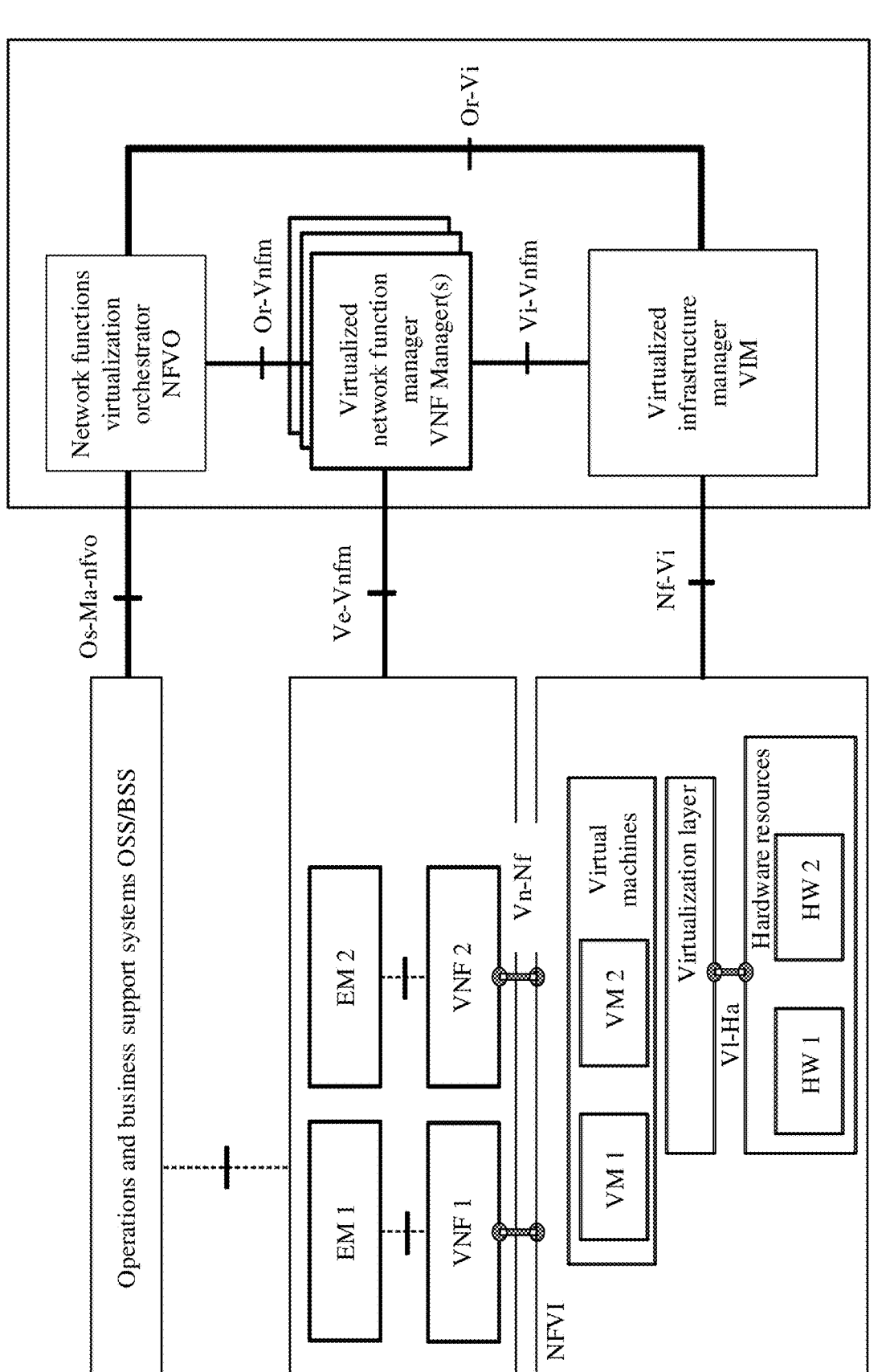
FIG. 1 is a schematic diagram of an architecture of an NFV system in a conventional technology.
Figure 2:
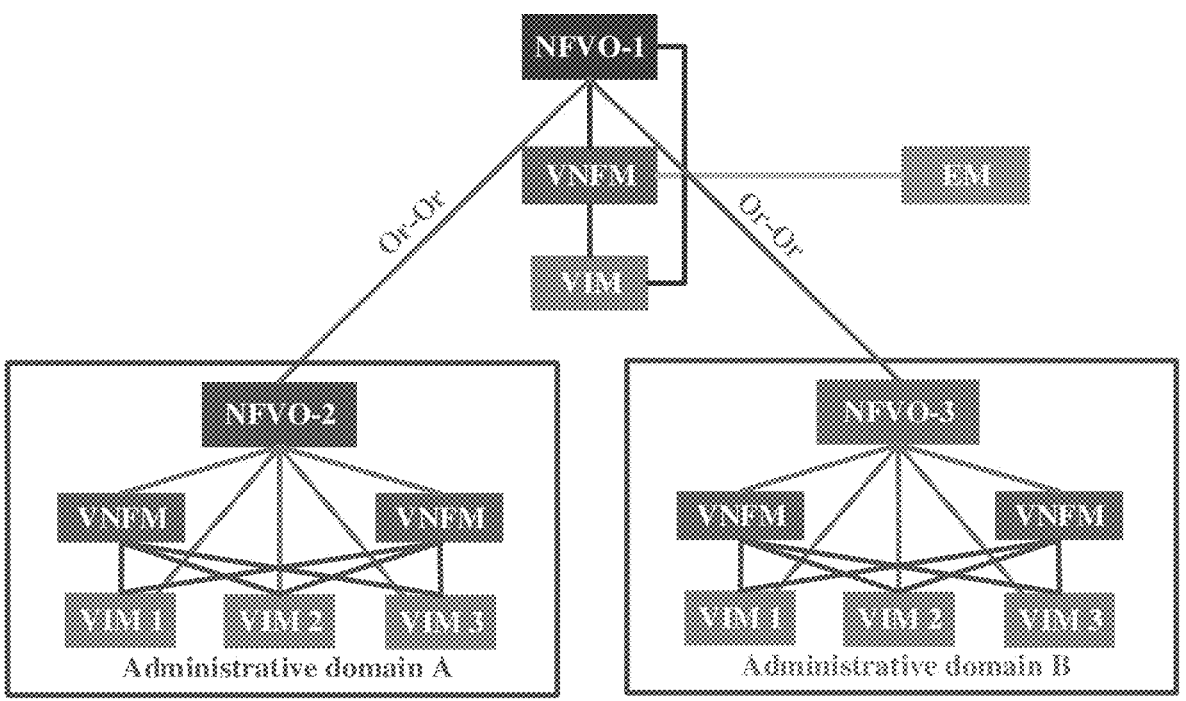
FIG. 2 is a schematic diagram of an architecture of a system with a plurality of administrative domains in a conventional technology.

Referring to FIG. 2, each of three administrative domains (Administrative Domain) is configured with one NFVO (NFVO-1, NFVO-2, and NFVO-3). A composite NS includes two nested NSs. The composite NS is managed by NFVO-1, and the two nested NSs are managed by NFVO-2 and NFVO-3, respectively. In FIG. 2, the administrative domains in which NFVO-1 and NFVO-2 are located are mutually associated administrative domains, and the administrative domains in which NFVO-1 and NFVO-3 are located are mutually associated administrative domains. An associated NS is formed between the composite NS and any nested NS, and the two nested NSs are not mutually associated NSs.

In a scenario in which there are a plurality of administrative domains, an NFVO for managing a composite NS is referred to as a composite NFVO (NFVO-Composite), and an NFVO for managing a nested NS is referred to as a nested NFVO (NFVO-Nested). Both the composite NFVO and the nested NFVO are configured with respective data analysis modules. The data analysis module may be configured with an artificial intelligence (AI) algorithm to intelligently analyze data that is collected by the NFVO from a plurality of different data sources (for example, one or more VNFMs or VIMs in an administrative domain of the NFVO), so as to form knowledge or experience specific to a field, which is used in an operation and maintenance management process of an NS. The collected data includes performance/alarm data, status data of an instance, and the like.

Regarding the foregoing data analysis module, 3GPP SA2 has carried out a study of enablers for network automation for 5G in Release 16 (TR 23.791). A network data analytics function (NWDAF) is introduced in a service based architecture (SBA) for a 5G core network, and the function is similar to a function of the foregoing data analysis module. A basic principle of network function automation is as follows: The NWDAF subscribes to input information required for network data analysis from a network function (or service) on a peripheral control plane, and distributes an analysis result to another network function (or service), such as a policy control function (PCF), through execution of an analysis algorithm of the NWDAF (it is generally considered that the analysis algorithm has an artificial intelligence capability), to help implement higher-order policy delivery and execution.

The analysis and prediction information is content output by the foregoing data analysis module. The knowledge or experience specific to a field that is formed by the data analysis module is provided to a subscriber in a form of analysis and prediction information. The analysis and prediction information may present different dimensions of NS operation and maintenance management. The analysis and prediction information may be an analysis report of an NS instance, for example, may be a health report (Analytic ID=NS Healthy) of the NS instance. The NFVO in the administrative domain collects information (such as performance management data, fault management data, an event, and a status) of the NS instance from the administrative domain and/or the associated administrative domain, and sends the information to the data analysis module for analysis and processing to form a health analysis result (healthy, sub-healthy, or unhealthy) of the NS instance in a running state.

Further, the analysis and prediction information may be an empirical model of the NS instance, and the empirical model may cover a plurality of dimensions of NS operation and maintenance management. A basic information structure of the empirical model includes identification information of the empirical model, description information of the empirical model, a type of the empirical model, and a storage address of an empirical model file. The data analysis module in the nested NFVO collects a large amount of data (such as performance, running status, and alarms) of a VNF of a nested NS instance member, and uses the data as massive input information of the data analysis module. The data analysis module may also use other model information of the nested NS (for example, topology information of the nested NS) as input information, and form, through AI analysis, an empirical model for a corresponding topology condition. Different empirical models have different NS operation and maintenance dimensions or themes, and empirical models formed in different dimensions have different model attribute fields, for example, an NS instance alarm correlation/root cause analysis empirical model is formed for NS fault management. In the NS instance alarm correlation/root cause analysis empirical model, when alarms of types A, B, and C occur simultaneously or sequentially to NS instances in the administrative domain, and corresponding environmental variables are used, it may be determined that a root cause of the fault of the NS instance is D. The empirical model can help the NFVO predict upcoming events in the future, for example, predict a root cause of an upcoming fault based on a rule of occurrence of alarm information, and take an early action to avoid occurrence of the fault.

The analysis and prediction information may alternatively be an NS topology model report. Based on a requirement of an affinity/anti-affinity rule of an NS member in the administrative domain and/or the associated administrative domain, and a QoS/availability status of a network link, the NFVO forms a topology connection model about the NS by performing analysis and processing by using the data analysis module. The topology connection model may be promoted and referenced in an administrative domain in which the NS is located or in an associated administrative domain.

Figure 3:
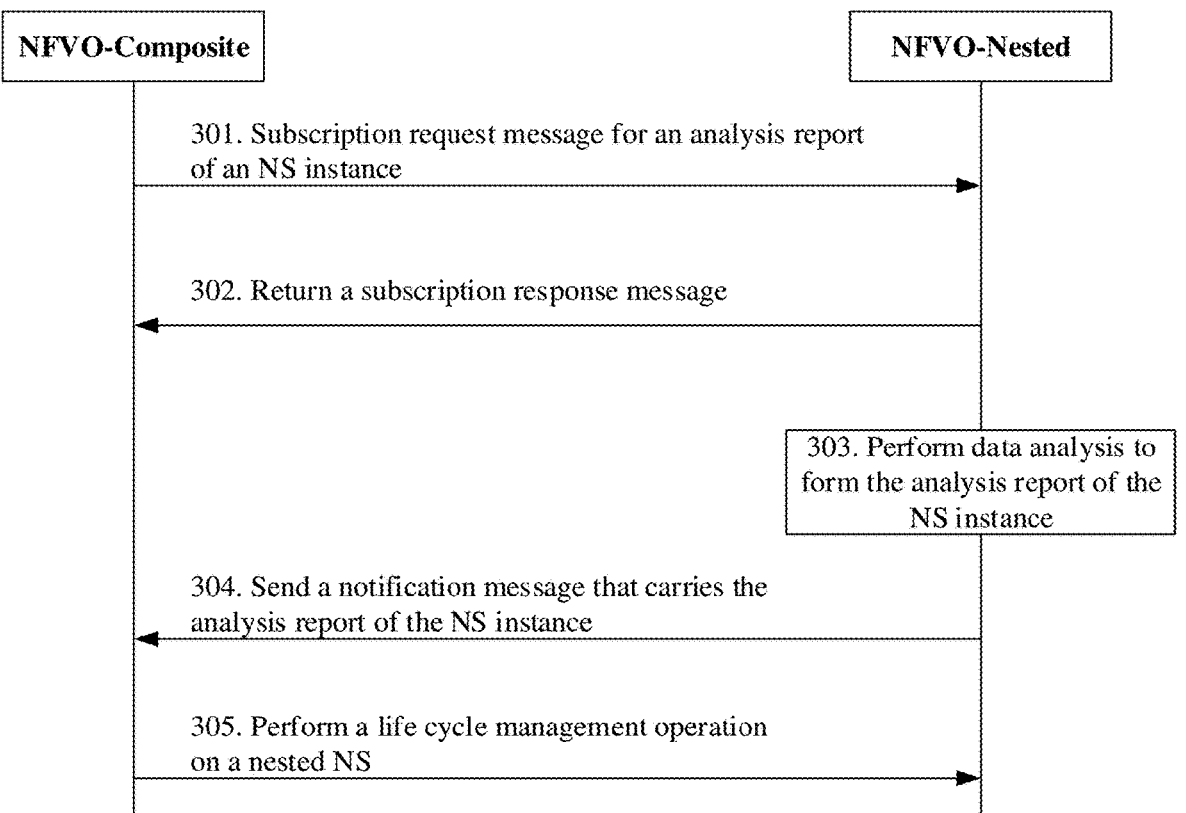
FIG. 3 is a flowchart of subscribing to an analysis report of a nested NS instance according to an embodiment of the present invention.

The present invention includes a plurality of embodiments, and these embodiments all relate to interaction between a plurality of administrative domains. The plurality of administrative domains include a composite network service (NS) administrative domain and one or more nested network service (NS) administrative domains, and the composite NS administrative domain and the nested NS administrative domain respectively include a composite network functions virtualization orchestrator (NFVO) and a nested NFVO. FIG. 3 is a flowchart of a first embodiment of the present invention. The flowchart relates to a procedure for subscribing to an analysis report of a nested NS, and the procedure mainly includes the following steps:

301. A composite NFVO sends a subscription request message for an analysis report of a nested NS instance to a nested NFVO, where the subscription request message carries an identifier of the nested NS instance, a specific form of a to-be-subscribed analysis report, and corresponding analysis dimension information.

As described above, the analysis report is a specific type of analysis and prediction information; and the analysis report may also be of many types or forms, and may be a health analysis report, or may be an NS topology model report. For a health analysis report, an analysis dimension is a dimension related to health, such as a health status indication (such as healthy, sub-healthy, or unhealthy), or a quantity of incoming and outgoing bytes of a service access point of the nested NS instance and/or a quantity of incoming and outgoing packets of the service access point of the nested NS instance.

302. The nested NFVO returns a subscription response message for the analysis report of the NS to the composite NFVO, and accepts subscription of the composite NFVO to the analysis report of the nested NS.

303. The nested NFVO performs, in the analysis dimension, data analysis on data collected by the nested NFVO, and forms the analysis report of the NS instance after analysis and processing. For example, the nested NFVO may determine, by using a built-in data analysis module and based on a specific type of the analysis and prediction information, to receive specific data of the nested NS instance, such as performance/alarm data, status data, and configuration data, and use the data as input to a data analysis algorithm to complete analysis and prediction. Basic attribute fields of the analysis report of the NS instance include identification information of the analysis report, description information of the analysis report, a type of the analysis report, and/or a storage address (such as a URL) of an analysis report file. In addition to the basic attribute fields described above, different types of analysis reports have other different attribute fields.

304. The nested NFVO sends a notification message to the composite NFVO, where the notification message carries the analysis report of the NS instance that is generated in step 303.

305. A built-in data analysis module of the composite NFVO analyzes the received analysis report of the NS instance, and initiates a life cycle management operation on the nested NS based on an analysis result.

In this embodiment, if the composite NFVO has subscribed to a health report of the nested NS from the nested NFVO, the composite NFVO analyzes the received health report, and initiates a life cycle management operation on the nested NS. The health analysis report may include a comprehensive evaluation result, for example, includes a health status indication (such as healthy, sub-healthy, or unhealthy), and analysis dimension information of the health analysis report may include a quantity of incoming and outgoing bytes of a service access point of the nested NS instance and/or a quantity of incoming and outgoing packets of the service access point of the nested NS instance. The composite NFVO determines, based on a value of the analysis dimension information and/or the health status indication in the analysis report, a capacity required for performing scaling of the nested NS instance, and initiates a scaling operation on the nested NS instance to the nested NFVO.

Figure 4:
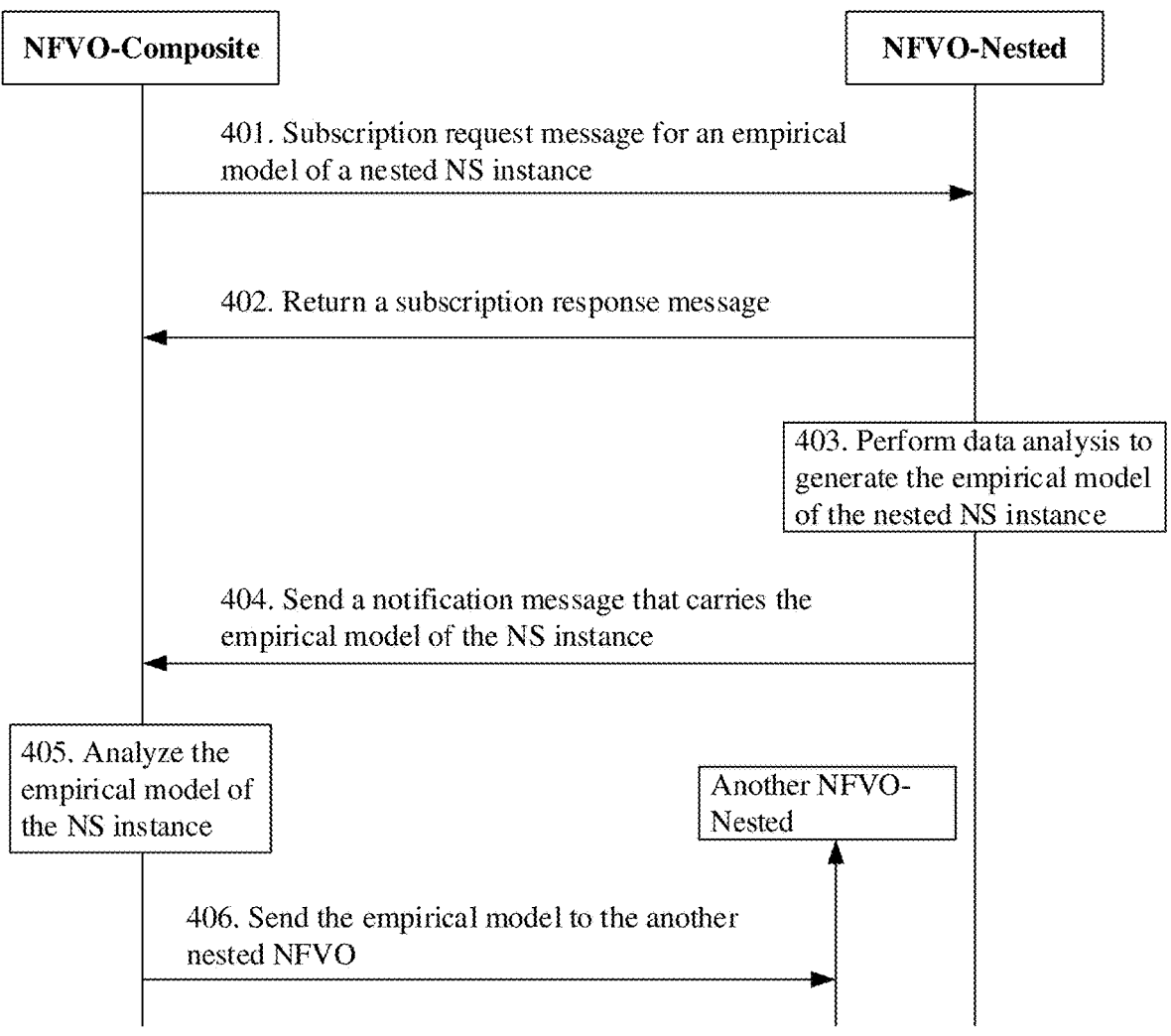
FIG. 4 is a flowchart of subscribing to an empirical model of a nested NS instance according to an embodiment of the present invention.

FIG. 4 is a flowchart of a second embodiment of the present invention. The flowchart mainly relates to a procedure for subscribing to, analyzing, and performing related processing on an empirical model. Steps of the procedure are similar to those in FIG. 3 in the foregoing first embodiment. The procedure mainly includes the following steps:

401. A composite NFVO sends a subscription request message to a nested NFVO, where the request message carries an identifier of a nested NS instance, a subscription request for an empirical model of the nested NS instance, and corresponding analysis dimension information.

402. The nested NFVO returns a subscription response message for the empirical model of the nested NS instance to the composite NFVO, and accepts subscription of the composite NFVO to the empirical model of the nested NS instance.

403. A built-in data analysis module of the nested NFVO performs, in the analysis dimension, data analysis on data collected by the nested NFVO, and generates the empirical model of the nested NS instance after analysis and processing.

The empirical model of the NS instance is a copy of a set of NS instances (including a software image and/or configuration information of NS members) calculated by the built-in data analysis module of the NFVO, and is matched with a specific theme in a specific environment. This matching relationship cannot be manually identified or determined.

404. The nested NFVO sends a notification message for the empirical model of the NS instance to the composite NFVO, where the notification message carries the empirical model of the NS instance that is generated in step 403.

405. A built-in data analysis module of the composite NFVO analyzes the received empirical model of the nested NS instance.

406. The composite NFVO determines, based on an analysis result, to send, to a nested NFVO in another administrative domain, the empirical model of the nested NS instance that is fed back by the nested NFVO, so that the empirical model of the nested NS instance can be replicated for use in a distributed administrative domain.

The following describes the foregoing steps 405 and 406 by using a specific example.

A software image and/or configuration information of a nested NS member in an empirical model has reliability of 99.999% and high availability in a commercial area (belonging to a nested administrative domain A) with a high population density and a high bandwidth application requirement. Then, a built-in data analysis module of a composite NFVO performs analysis by matching parameters of an operation environment of a nested NS to determine whether a software image (version) and configuration information of a same nested NS member can be distributed to another commercial area (belonging to a nested administrative domain B) with a same population density and a high bandwidth application requirement, and a nested NFVO of the administrative domain B completes implementation of the empirical model in the administrative domain B. If the software image (version) and the configuration information of the same nested NS member can be applied to the another commercial area (belonging to the nested administrative domain B) with the same population density and the high bandwidth application requirement, the nested NFVO of the administrative domain B loads the software image version of the NS member in the empirical model into the administrative domain B, and initiates, to a VNFM in the administrative domain B, a procedure for modifying VNF information of the NS member in the empirical model.

Figure 5:
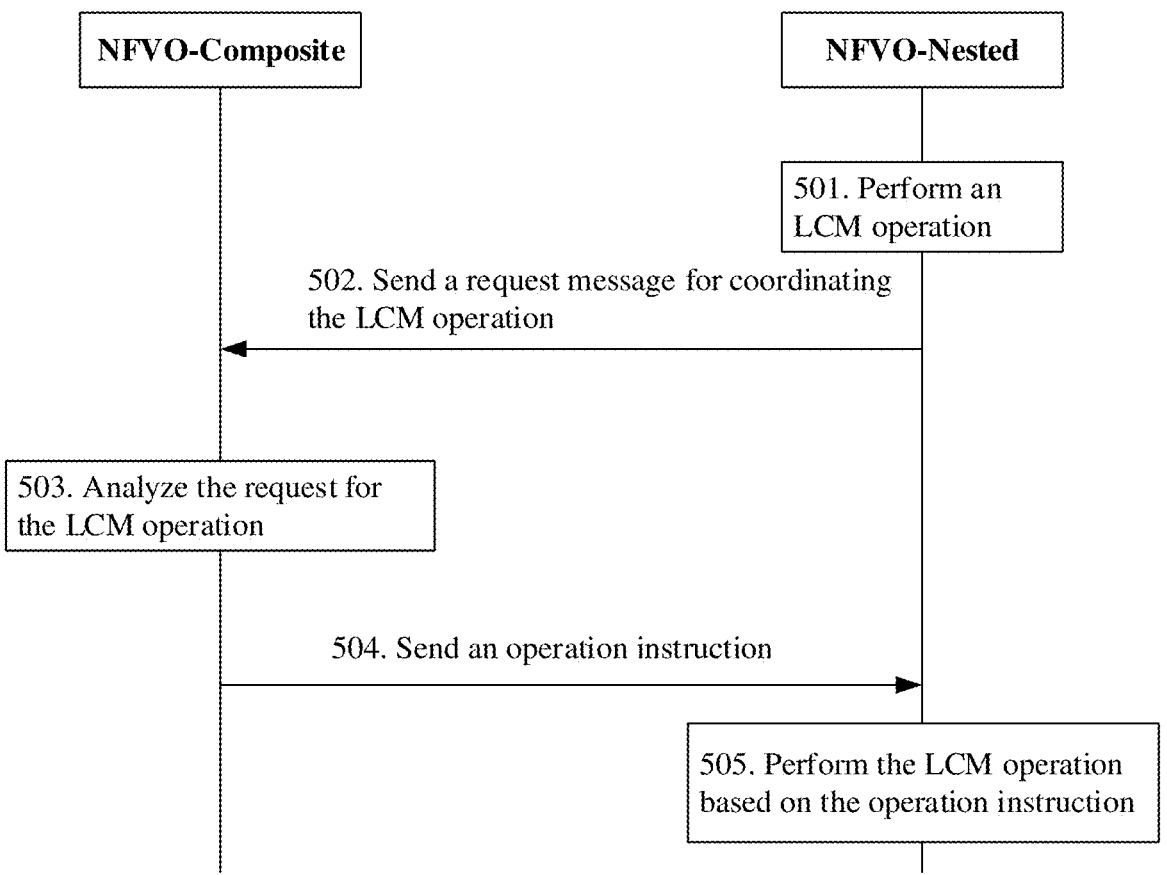
FIG. 5 is a flowchart of life cycle management of a nested NS according to an embodiment of the present invention.

FIG. 5 is a flowchart of life cycle management of a nested NS according to a third embodiment of the present invention. The figure mainly describes when a nested NFVO performs a life cycle management operation on a nested NS, the nested NFVO initiates a request for coordinating life cycle management (LCM coordination) to a composite NFVO, so as to avoid a conflict between a life cycle management operation to be performed on a nested NS and a life cycle management operation performed on another nested NS instance. A procedure of this embodiment mainly includes the following steps:

501. A nested NFVO performs a life cycle management (LCM) operation on a nested NS.

The life cycle management (LCM) operation on the nested NS may be that the nested NFVO receives a life cycle management request from an OSS/BSS, and then performs a corresponding LCM operation based on the request.

502. The nested NFVO sends a request message for coordinating the LCM operation to a composite NFVO, where the request message carries a type of the LCM operation and an operation stage in which the LCM operation is located.

The operation stage includes stages such as a start stage, an intermediate stage, and an end stage. For example, the request message may carry a scaling out (Scaling Out) operation to be performed on a nested NS instance by the nested NFVO, and the operation stage is the intermediate stage.

503. A built-in data analysis module of the composite NFVO analyzes the request for the life cycle management operation on the nested NS based on the received LCM coordination request and with reference to data collected by the composite NFVO, for example, determines whether there is a potential conflict with an operation performed on another nested NS instance.

For example, when the nested NFVO needs to perform the scaling out operation on the nested NS instance, the nested NFVO sends the LCM coordination request to the composite NFVO, and the composite NFVO determines whether any operation performed on a current composite NS or another nested NS conflicts with the scaling out operation to be performed on the nested NS instance.

504. The composite NFVO returns an LCM coordination response to the nested NFVO, where the response message carries an operation instruction of the composite NFVO for the LCM of the nested NS, for example, aborting execution, continuing execution, executing after delay, or retrying after delay. For the operation instruction "executing after delay" or "retrying after delay", the response message further indicates a delay time.

The example in step 503 is still used for description. If a network service healing (NS Healing) operation is being performed on another nested NS instance that has a dependency relationship with the nested NS instance, and the operation conflicts with or may conflict with the scaling out operation to be performed on the nested NS instance, the composite NFVO indicates the nested NFVO to temporarily suspend the scaling out operation to be performed on the nested NS instance; and after the NS healing operation is performed on a nested NS instance B in the dependency relationship, the composite NFVO indicates the nested NFVO to perform the scaling out operation on the nested NS instance.

505. The nested NFVO performs the LCM operation on the nested NS based on the coordination operation instruction fed back in step 504.

Figures 6, 7:
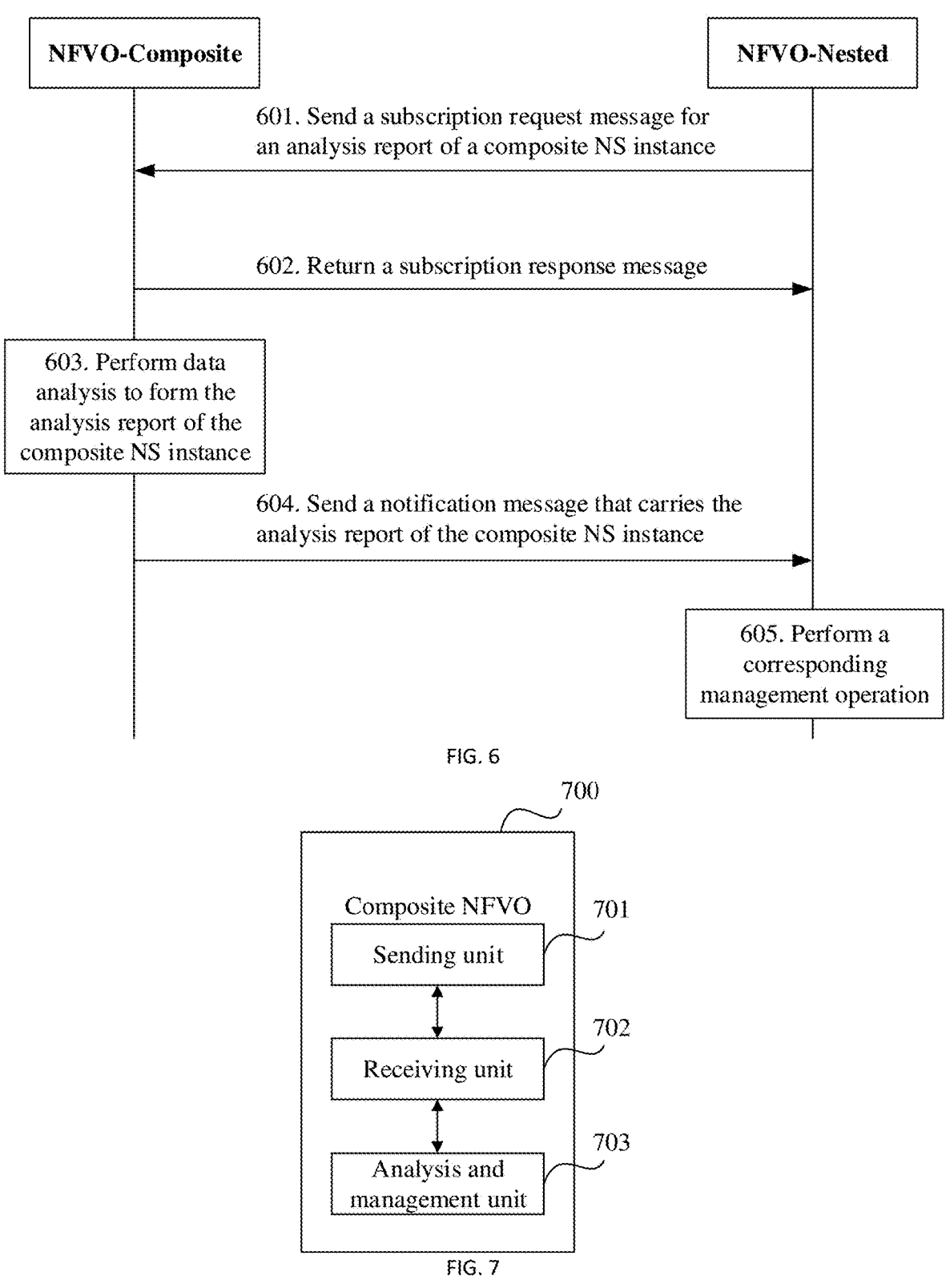
FIG. 6 is a flowchart of subscribing to an analysis report of a composite NS instance according to an embodiment of the present invention.
FIG. 7 is a schematic diagram of a structure of a composite NFVO according to an embodiment of the present invention.

FIG. 6 is a flowchart of a fourth embodiment of the present invention. The flowchart relates to subscribing to analysis and prediction information of a composite NS instance by a nested NFVO from a composite NFVO. In this embodiment, a type of the analysis and prediction information is an analysis report of the composite NS instance. This embodiment mainly includes the following steps:

601. A nested NFVO sends a subscription request message for an analysis report of a composite NS instance to a composite NFVO, where the request message carries an identifier of the composite NS instance, an analysis report of the composite NS instance, and corresponding analysis dimension information.

602. The composite NFVO returns a subscription response message to the nested NFVO, and accepts the foregoing subscription request of the nested NFVO.

603. Similar to step 303 in the foregoing first embodiment, a built-in data analysis module of the composite NFVO performs, in the analysis dimension, data analysis on data collected by the composite NFVO, so as to generate an analysis report of the composite NS instance.

604. The composite NFVO sends a notification message to the nested NFVO, where the notification message carries the analysis report of the composite NS instance that is generated in step 603.

605. The nested NFVO performs a life cycle management operation on a nested NS based on the received analysis report of the composite NS instance.

Further, in this embodiment, if a type of the analysis report that is subscribed to by the nested NFVO from the composite NFVO is a health report of the composite NS, the nested NFVO analyzes the received health report of the composite NS, and initiates a life cycle management operation on a local nested NS.

In the embodiments of the present invention, the composite NFVO and the nested NFVO may be divided into function units based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in the embodiments of the present invention, unit division is merely an example, and is merely logical function division. In an actual implementation, another division manner may be used.

FIG. 7 is a possible schematic diagram of a structure of a composite NFVO in the foregoing embodiments. Similarly, the composite NFVO and a nested NFVO are respectively located in a composite NS administrative domain and a nested NS administrative domain. The composite NFVO 700 includes a sending unit 701, a receiving unit 702, and an analysis and management unit 703.

The sending unit 701 is configured to send a subscription request message for analysis and prediction information of a nested NS instance to the nested NFVO, where the subscription request message carries an identifier of the nested NS instance, a type of the analysis and prediction information, and corresponding analysis dimension information.

The receiving unit 702 is configured to receive a subscription response message returned by the nested NFVO.

The receiving unit 702 is further configured to receive a notification message that is sent by the nested NFVO and that carries the analysis and prediction information of the nested NS instance, where the analysis and prediction information is generated by a built-in data analysis module of the nested NFVO after performing, in the analysis dimension based on the type of the analysis and prediction information, data analysis on data collected by the nested NFVO.

The analysis and management unit 703 is configured to perform a corresponding management operation based on the received analysis and prediction information.

The type of the analysis and prediction information carried in the subscription request message may be an analysis report of the NS instance, or may be an empirical model of the NS instance.

If the analysis and prediction information carried in the subscription request message is the analysis report of the NS instance, the analysis and management unit 703 analyzes the received analysis report of the nested NS instance, and performs a life cycle management (LCM) operation on the nested NS instance based on an analysis result.

If the analysis and prediction information carried in the subscription request message is the empirical model of the NS instance, the analysis and management unit 703 analyzes the received empirical model of the nested NS instance, and sends the empirical model of the nested NS instance to an NFVO in another nested NS administrative domain based on an analysis result.

It may be understood that units of the composite NFVO 700 may also perform other steps in the foregoing related method embodiments, and details are not described herein again.

Figures 8, 9:
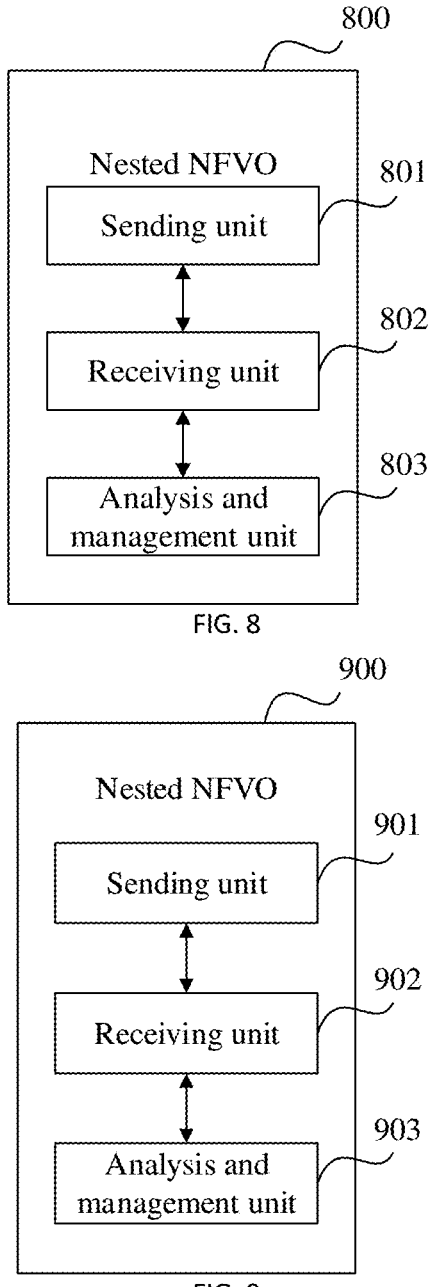
FIG. 8 is a schematic diagram of a structure of a nested NFVO according to an embodiment of the present invention.
FIG. 9 is a schematic diagram of a structure of another nested NFVO according to an embodiment of the present invention.

FIG. 8 is a possible schematic diagram of a structure of a nested NFVO in the foregoing embodiments. Similarly, a composite NFVO and the nested NFVO are respectively located in a composite NS administrative domain and a nested NS administrative domain. The nested NFVO 800 includes a sending unit 801, a receiving unit 802, and an analysis and management unit 803.

The sending unit 801 is configured to send a subscription request message for analysis and prediction information of a composite NS instance to the composite NFVO, where the subscription request message carries an identifier of the composite NS instance, a type of the analysis and prediction information, and corresponding analysis dimension information.

The receiving unit 802 is configured to receive a subscription response message returned by the composite NFVO.

The receiving unit 802 is further configured to receive a notification message that is sent by the composite NFVO and that carries the analysis and prediction information of the composite NS instance, where the analysis and prediction information is generated by the composite NFVO after performing, in the analysis dimension based on the type of the analysis and prediction information, data analysis on data collected by the composite NFVO.

The analysis and management unit 803 is configured to perform a corresponding management operation based on the received analysis and prediction information.

If the analysis and prediction information carried in the subscription request message is an analysis report of the composite NS instance, the analysis and management unit 803 analyzes the received analysis report of the composite NS instance, and performs a life cycle management (LCM) operation on a nested NS instance based on an analysis result.

It may be understood that units of the nested NFVO 800 may also perform other steps in the foregoing related method embodiments, and details are not described herein again.

FIG. 9 is a possible schematic diagram of a structure of a nested NFVO in the foregoing embodiments. Similarly, a composite NFVO and the nested NFVO are respectively located in a composite NS administrative domain and a nested NS administrative domain. The nested NFVO 900 includes a sending unit 901, a receiving unit 902, and an analysis and management unit 903.

The analysis and management unit 903 is configured to perform a life cycle management (LCM) operation on a nested NS.

The sending unit 901 is configured to send a request message for coordinating the LCM operation to the composite NFVO, where the request message carries a type of the LCM operation and an operation stage in which the LCM operation is located.

The receiving unit 902 is configured to receive an LCM coordination response returned by the composite NFVO, where the response message carries a coordination operation instruction of the composite NFVO for the LCM of the nested NS.

The analysis and management unit 903 is configured to perform the LCM operation on the nested NS based on the coordination operation instruction.

The performing the LCM operation on the nested NS based on the coordination operation instruction includes: continuing to perform the LCM operation, aborting performing the LCM operation, and postponing performing the LCM operation.

Figure 10:
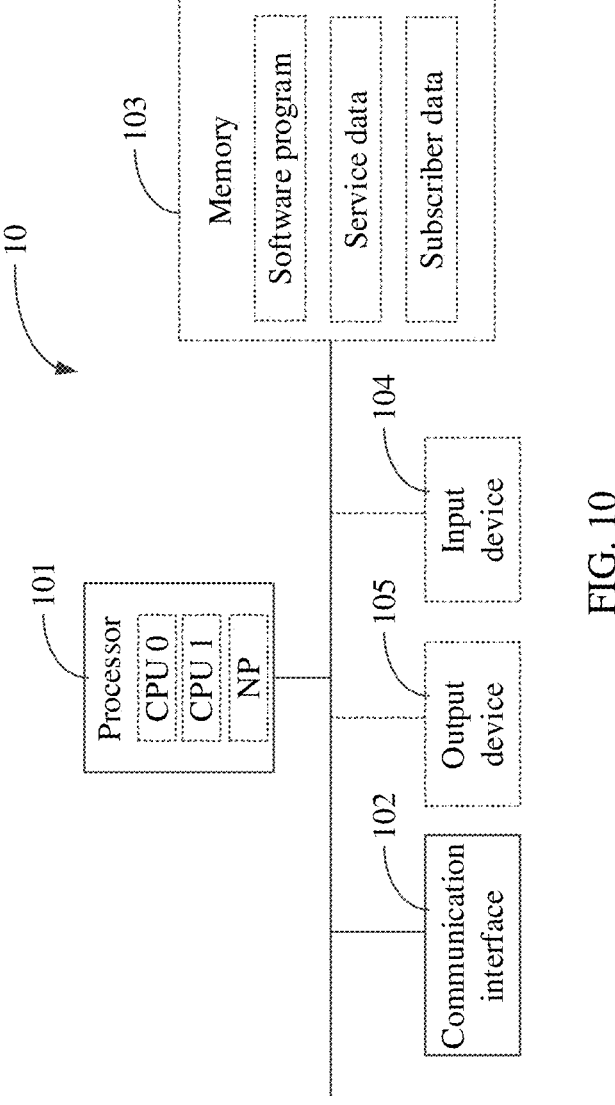
FIG. 10 is a hardware diagram of an NFVO apparatus according to an embodiment of the present invention.

FIG. 10 is an apparatus hardware diagram of an NFVO 100 according to another embodiment of the present invention. The apparatus may include a processor, a communication interface, and a memory.

The processor 101 may include one or more processing units. The processing unit may be a central processing unit (central processing unit, CPU), a network processor (network processor, NP), or the like.

The communication interface 102 is configured to connect to and exchange information with another communication device, including receiving and sending a corresponding message. The NFVO 100 may further include the memory 103, and the processor 101 may be connected to the memory 103 and the communication interface 102 by using a bus.

The memory 103 may be configured to store a software program, and the software program may be executed by the processor 101, so as to implement the method steps in the embodiments shown in FIG. 3 to FIG. 6. In addition, the memory 103 may further store various types of service data or user data, including status data of various application instances and services in the steps of the foregoing methods, and the like. For example, in the first embodiment (FIG. 3) of the present invention, the nested NFVO stores data collected by the nested NFVO, analyzes the data, stores an analysis report of an NS instance that is formed after the analysis, and the like; and the composite NFVO stores the received analysis report of the NS instance.

Optionally, the NFVO 100 may further include an input device 104 and an output device 105. The input device 104 and the output device 105 are connected to the processor

101. The output device 105 may be a display configured to display information, a power amplifier device for playing a sound, a printer, or the like. The output device 105 may include an output controller, configured to provide output to the display, the power amplifier device, or the printer. The input device 104 may be a device used by a user to enter information, such as a mouse, a keyboard, an electronic stylus, or a touch control panel. The input device 104 may further include an output controller, configured to receive and process input from the device such as the mouse, the keyboard, the electronic stylus, or the touch control panel.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, radio or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital versatile disc (DVD)), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are the embodiments provided in this application, but are not intended to limit this application. Any modification, equivalent replacement, or improvement made without departing from the principle of this application shall fall within the protection scope of this application.

The invention claimed is:

1. A method, comprising:

sending, by a composite network functions virtualization orchestrator (NFVO) to a nested NFVO, a subscription request message for analysis and prediction information of a nested network service (NS) instance, wherein the subscription request message carries an identifier of the nested NS instance, a type of the analysis and prediction information, and analysis dimension information corresponding to the analysis and prediction information, wherein a plurality of administrative domains comprise a composite NS administrative domain and a nested NS administrative domain, and the composite NS administrative domain and the nested NS administrative domain each comprise the composite NFVO and the nested NFVO;

receiving, by the composite NFVO, a subscription response message returned by the nested NFVO;

receiving, by the composite NFVO, a notification message that is sent by the nested NFVO, wherein the notification message carries the analysis and prediction information of the nested NS instance, and wherein the analysis and prediction information is generated by the nested NFVO after performing data analysis on the nested NS instance in the analysis dimension based on the type of the analysis and prediction information; and performing, by the composite NFVO, a management operation based on the received analysis and prediction information.

2. The method according to claim 1, wherein the type of the analysis and prediction information carried in the subscription request message is an analysis report of the NS instance, and performing, by the composite NFVO, the management operation based on the received analysis and prediction information comprises:

analyzing, by the composite NFVO, the analysis report of the nested NS instance, and performing a life cycle management (LCM) operation on the nested NS instance based on an analysis result.

3. The method according to claim 2, wherein the analysis report of the nested NS instance is a health analysis report, analysis dimension information of the health analysis report comprises a quantity of incoming and outgoing bytes of a service access point of the nested NS instance or a quantity of incoming and outgoing packets of the service access point of the nested NS instance, and a comprehensive evaluation result of the health analysis report comprises a health status indication.

4. The method according to claim 3, further comprising:

determining, by the composite NFVO, based on a value of the analysis dimension information or the health status indication in the comprehensive evaluation result of the health analysis report, a capacity required for performing scaling of the nested NS instance, and initiating a scaling operation on the nested NS instance to the nested NFVO.

5. The method according to claim 1, wherein the type of the analysis and prediction information carried in the subscription request message is an empirical model of the nested NS instance, and performing, by the composite NFVO, the management operation based on the received analysis and prediction information comprises:

analyzing, by the composite NFVO, the received empirical model of the nested NS instance, and sending the empirical model of the nested NS instance to an NFVO in another nested NS administrative domain based on an analysis result.

6. The method according to claim 5, wherein the empirical model of the nested NS instance is an empirical model of NS instance alarm correlation or a root cause analysis.

7. The method according to claim 5, wherein the empirical model comprises a type and description information of the empirical model.

8. A communication device, comprising:

at least one processor; and a non-transitory computer readable storage medium storing programming for execution by the at least one processor to cause the communication device to:

send a subscription request message for analysis and prediction information of a nested network service (NS) instance to a nested network functions virtualization orchestrator (NFVO), wherein the subscription request message carries an identifier of the nested NS instance, a type of the analysis and prediction information, and analysis dimension information corresponding to the analysis and prediction information;

receive a subscription response message returned by the nested NFVO;

receive a notification message that is sent by the nested NFVO and that carries the analysis and prediction information of the nested NS instance, wherein the analysis and prediction information is generated by the nested NFVO after performing data analysis on the nested NS instance in the analysis dimension based on the type of the analysis and prediction information; and perform a management operation based on the received analysis and prediction information.

9. The communication device according to claim 8, wherein the type of the analysis and prediction information carried in the subscription request message is an analysis report of the NS instance, and wherein the programming further includes instructions for execution by the at least one processor to cause the communication device to:

analyze the received analysis report of the nested NS instance, and perform a life cycle management (LCM) operation on the nested NS instance based on an analysis result.

10. The communication device according to claim 9, wherein the analysis report of the nested NS instance is a health analysis report, analysis dimension information of the health analysis report comprises a quantity of incoming and outgoing bytes of a service access point of the nested NS instance or a quantity of incoming and outgoing packets of the service access point of the nested NS instance, and a comprehensive evaluation result of the health analysis report comprises a health status indication.

11. The communication device according to claim 10, wherein the programming further includes instructions for execution by the at least one processor to cause the communication device to:

determine, based on a value of the analysis dimension information or the health status indication in the comprehensive evaluation result of the health analysis report, a capacity required for performing scaling of the nested NS instance, and initiate a scaling operation on the nested NS instance to the nested NFVO.

12. The communication device according to claim 8, wherein the type of the analysis and prediction information carried in the subscription request message is an empirical model of the nested NS instance, and wherein the programming further includes instructions for execution by the at least one processor to cause the communication device to:

analyze the received empirical model of the nested NS instance, and send the empirical model of the nested NS instance to an NFVO in another nested NS administrative domain based on an analysis result.

13. The communication device according to claim 12, wherein the empirical model of the nested NS instance is an empirical model of NS instance alarm correlation or a root cause analysis.

14. The communication device according to claim 12, wherein the empirical model comprises a type and description information of the empirical model.

15. A method, comprising: receiving, by a nested network functions virtualization orchestrator (NFVO) from a composite NFVO, a subscription request message for analysis and prediction information of a nested network service (NS) instance, wherein the subscription request message carries an identifier of the nested NS instance, a type of the analysis and prediction information, and analysis dimension information corresponding to the analysis and prediction information, and wherein a plurality of administrative domains comprise a composite NS administrative domain and a nested NS administrative domain, the composite NS administrative domain and the nested NS administrative domain each comprise the composite NFVO and the nested NFVO;

sending, by the nested NFVO, a subscription response message to the composite NFVO; and sending, by the nested NFVO, a notification message that carries the analysis and prediction information of the nested NS instance, wherein the analysis and prediction information is generated by the nested NFVO after performing data analysis on the nested NS instance in the analysis dimension based on the type of the analysis and prediction information.

16. The method according to claim 15, wherein the type of the analysis and prediction information carried in the subscription request message is an analysis report of the NS instance or an empirical model of the nested NS instance.

17. The method according to claim 16, wherein the analysis report of the nested NS instance is a health analysis report, analysis dimension information of the health analysis report comprises a quantity of incoming and outgoing bytes of a service access point of the nested NS instance or a quantity of incoming and outgoing packets of the service access point of the nested NS instance, and a comprehensive evaluation result of the health analysis report comprises a health status indication.

18. A communication device, comprising:

at least one processor; and a non-transitory computer readable storage medium storing programming for execution by the at least one processor to cause the communication device to:

receive a subscription request message for analysis and prediction information of a nested network service (NS) instance from a composite network functions virtualization orchestrator (NFVO), wherein the subscription request message carries an identifier of the nested NS instance, a type of the analysis and prediction information, and analysis dimension information corresponding to the analysis and prediction information, and wherein a plurality of administrative domains comprise a composite NS administrative domain and a nested NS administrative domain, and the composite NS administrative domain and the nested NS administrative domain each comprise the composite NFVO and the nested NFVO;

send a subscription response message to the composite NFVO; and send a notification message that carries the analysis and prediction information of the nested NS instance, wherein the analysis and prediction information is generated by the nested NFVO after performing data analysis on the nested NS instance in the analysis dimension based on the type of the analysis and prediction information.

19. The communication device according to claim 18, wherein the type of the analysis and prediction information carried in the subscription request message is an analysis report of the NS instance or an empirical model of the nested NS instance.

20. The communication device according to claim 19, wherein the analysis report of the nested NS instance is a health analysis report, analysis dimension information of the health analysis report comprises a quantity of incoming and outgoing bytes of a service access point of the nested NS instance or a quantity of incoming and outgoing packets of the service access point of the nested NS instance, and a comprehensive evaluation result of the health analysis report comprises a health status indication.

* * * * *